(12) United States Patent
Yotsumoto (10) Patent No.: US 6,940,925 B2
(45) Date of Patent: Sep. 6, 2005

(54) RECEIVER (75) Inventor: Koji Yotsumoto, Chitose (JP)

(73) Assignee: Hitachi Kokusai Electric Inc., Tokyo (JP)

(*) Notice: Subject to any disclaimer, the term of this patent is extended or adjusted under 35 U.S.C. 154(b) by 748 days.

(21) Appl. No.: 09/765,274

(22) Filed: Jan. 22, 2001

(65) Prior Publication Data

US 2001/0009573 A1 Jul. 26, 2001

(30) Foreign Application Priority Data

Jan. 24, 2000 (JP) ........................................ 2000-014281
Jan. 11, 2001 (JP) ........................................ 2001-003739

(51) Int. Cl.[7] .......................... H04L 27/06; H04L 27/20; H04B 1/00
(52) U.S. Cl. ........................ 375/340; 375/295; 455/69
(58) Field of Search ............................. 375/340, 295, 375/332, 322, 222; 455/69

(56) References Cited

U.S. PATENT DOCUMENTS

| | | | | |
|---|---|---|---|---|
| 5,109,528 A | * | 4/1992 | Uddenfeldt | 455/442 |
| 5,740,208 A | * | 4/1998 | Hulbert et al. | 375/346 |
| 5,930,288 A | * | 7/1999 | Eberhardt | 375/148 |
| 6,005,856 A | * | 12/1999 | Jensen et al. | 370/337 |
| 6,130,918 A | * | 10/2000 | Humphrey et al. | 375/295 |
| 6,317,452 B1 | * | 11/2001 | Durrant et al. | 375/130 |
| 6,519,237 B1 | * | 2/2003 | McDonough et al. | 370/335 |
| 6,667,965 B1 | * | 12/2003 | Yamaura et al. | 370/347 |
| 6,690,922 B1 | * | 2/2004 | Lindemann | 455/69 |

OTHER PUBLICATIONS

Goodman, David, J. Wireless Personal Communications Systems, Jan. 1998, Addison Wesley Longman Inc., vol. II, pp. 140–149.*
Goodman, David, J. Wireless Personal Communications Systems, Jan. 1998, Addison Wesley Longman Inc., vol. II, pp. 140–149.*

* cited by examiner

*Primary Examiner*—Amanda T. Le
*Assistant Examiner*—Cicely Ware
(74) *Attorney, Agent, or Firm*—Wenderoth, Lind & Ponack, L.L.P.

(57) ABSTRACT

A receiver detects a highly precise approximate value of the power of a reception signal with a high speed. A first comparator outputs a larger of a component I and component Q of a reception signal as a first output value and a smaller as a second output value. A 3-bit shift register multiplies the first output value by ⅛, a subtractor subtracts the by-⅛-multiplied value from the first output value, and a 1-bit shift register multiplies the second output value by ½. A 2-bit shift register multiplies the by-½-multiplied value by ¼, a first adder adds the first output value and the by-¼-multiplied value, and a second adder adds an output value from the subtractor and an output value from the 1-bit shift register. A second comparator outputs the value of a larger result of the two additions as an approximate power of the reception signal.

7 Claims, 5 Drawing Sheets

RECEIVER

BACKGROUND OF THE INVENTION

1. Field of the Invention

The present invention relates to a receiver that detects an approximate value of the power of a reception signal. Especially, the invention relates to a receiver that enables detection of the highly precise approximate value with a high speed.

2. Description of the Related Art

In, for example, a communication system, it is indispensable to detect the power (level) of a reception signal by a relevant receiver. As an example, in a mobile-station device that is equipped in a radio communication system, the powers of the signals that are received from a plurality of base-station devices that exist in the neighborhood thereof are detected and compared at all times with one another by the receiver. Thereby, the receiver recognizes a base-station device, the power of which signal is maximum, to be an optimum base-station device. According to this recognition, the receiver selects that base-station device as an opponent device for its communication.

The above-described detection of the power is ordinarily realized through the execution of an operation process that is made according to the reception signal. Such operation process will hereafter be explained in detail.

Incidentally, in the claims of this specification, a component I represents the absolute value of the component I, and a component Q represents the absolute value of the component Q. Also, in the other parts of this specification, in the detection (operation) of an approximate value of the power of a reception signal, a component I represents the absolute value of the component I, and a component Q represents the absolute value of the component Q.

First, assume that I represents the value of a component I of the reception signal (the absolute value of the component I); and Q represents the value of a component Q (the absolute value of the component Q). Then, theoretically, the power P of the reception signal is given by the following Equation No. 1. It is to be noted that the component I and component Q of the reception signal mean two digital de-modulated signals, the phase difference between which is 90 degrees. Each of these digital de-modulated signals is obtained by de-modulating, for example, the reception signal that has been subjected to orthogonal modulation.

[Equation No. 1]

$$P=(I^2+Q^2)^{1/2} \quad (1)$$

However, when attempting to realize the operation process given as the above Equation No. 1 with the use of an actual digital circuit, because the operation process contains therein the self-multiplication operation of, for example, the I or Q, the number of digits necessary for execution of the operation inconveniently becomes twice as large. Namely, the number of the bits necessary in the digital circuit inconveniently becomes twice as large. For this reason, the circuit becomes large in scale, and in addition the compactness that is loaded upon, the circuit inconveniently becomes high in degree. Also, even when executing such operation process with the use of, for example, a DSP (Digital Signal Processor) or a CPU (Central Processing Unit), because there is the above-described self-multiplication operation, the amount of operation processing, the time length of operation processing, etc. inconveniently becomes very large.

On that account, an attempt to use not the strict theoretical equation shown in the above Equation No. 1, but an approximate equation for operating the power of the reception signal has hitherto been made. And, an attempt has thereby been made to use only an addition operation instead of the multiplication/addition operations shown in the Equation No. 1.

Here, an approximate equation that is frequently used is shown below as Equation No. 2. It is to be noted that P represents the power (here, an approximate value) of the reception signal; MAX (I, Q) represents a larger one of the value I and the value Q; and MIN (I, Q) represents a smaller one of the value I and the value Q.

[Equation No. 2]

$$P=(^{10}/_{11}) \times \text{MAX}(|I|,|Q|)+(^{5}/_{11}) \times \text{MIN}(|I|,|Q|) \quad (2)$$

Also, conventionally, the operation equation shown in the above Equation No. 2 is further approximated to one operation equation that is suitable to the execution of the operation process in a digital circuit. This approximate equation is shown as the following Equation No. 3.

[Equation No. 3]

$$P=\text{MAX}(|I|,|Q|)+(\frac{1}{2}) \times \text{MIN}(|I|,Q|) \quad (3)$$

Figure 5:
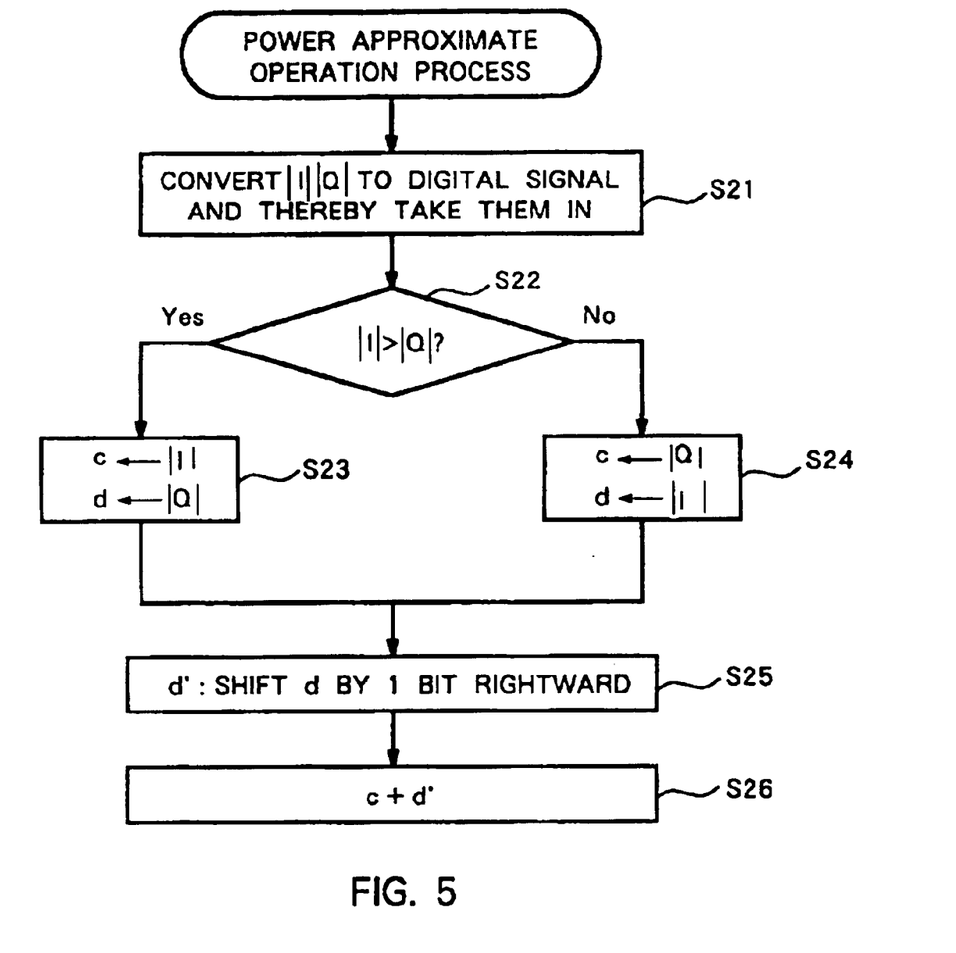
FIG. 5 is a view illustrating an example of the procedure of the power approximate-operation process according to the convention technique.

Also, in FIG. 5, illustration is made of an example of the procedure of the power approximate-operation process that is taken when the receiver makes its operation of an approximate value of the power of the reception signal by using the approximate equation shown as the Equation No. 3.

Namely, in the receiver, first, the component I and component Q of the reception signal are taken in as digital signals (step S21). The value I and the value Q are then compared with each other to determine which one of them is larger or smaller (step S22).

As a result of this, if the value I is larger, the value I is set to be c=I and the value Q is set to be d=Q (step S23). If the value Q is larger, the value as the approximate value of the power of the reception Q is set to be c=Q; and the value I is set to be d=I (step S24).

Next, in the receiver, the value that is obtained by shifting the value d by 1 bit rightward (i.e., the value that is obtained by multiplying the value d by ½) is set to be d' (step S25). Then, the operation of (c+d') is executed. The result of this operation is detected signal (step S26).

However, in the conventional receiver arranged to detect the approximate value of the power of the reception signal by using the one approximate equation shown, for example, by the above Equation No. 3 (the one that is obtained by being made further approximated to the preceding approximate equation), the error that is produced by that approximate equation is large in value. Therefore, the precision of this approximate value is low. Resultantly, there was the inconvenience that the quality of the communication became deteriorated.

As an example, in the mobile-station device that, as described above, is at all times detecting the power of the reception signal from each of the base-station devices that exist in the neighboring area upon that mobile-station device, because the error made from that detection is too large, the mobile-station device erroneously recognizes the base-station device that is not optimum as being an optimum base-station device. As a result, there was the possibility that the mobile-station device would select a base-station device that was not the optimum base-station device.

SUMMARY OF THE INVENTION

The present invention has been made in order to solve the above-described conventional problems and has an object to provide a receiver that enables detecting a highly precise approximate value of the power of the reception signal with a high speed.

Another object of the invention is to provide a receiver that comprises a digital circuit enabling high-precision and high-speed detection to be made as a preferred embodiment.

To attain the above object, the receiver according to the invention detects an approximate value of the power of the reception signal as follows.

Namely, first operation means performs addition of a value, which is obtained by multiplying a smaller one of the component I value and the component Q value of the reception signal by ⅛, and a larger one of them. Second operation means performs addition of a value, which is obtained by multiplying a smaller one of the component I value and the component Q value of the reception signal by ½, and a value that is obtained by multiplying a larger one of them by ⅞. Detection means detects a larger one of the operation result of the first operation means and the operation result of the second operation means as an approximate value of the power of the reception signal.

Accordingly, because the above-described operation process does not contain, for example, a self-multiplication operation and therefore suits a digital operation process, it is possible to perform the operation process with a high speed. In addition, as illustrated in, for example, an embodiment as later described, the power of the reception signal can be detected with a high precision (i.e., a highly precise approximate value can be detected) compared to the conventional receiver. Therefore, a high quality of communication can be ensured.

Also, in the receiver of the invention, an approximate value of the power of the reception signal is detected by, f or example, the following digital-circuit construction to thereby realize the highly precise and high-speed detection in the same way as has been described above.

That is, a first comparator compares a component I and component Q of the reception signal in scale and outputs a larger one of these component values as a first output value. The first comparator simultaneously outputs a small one of them as a second output value. A 3-bit shift register multiplies the first output value from the first comparator by ⅛, and a subtractor subtracts the output value from the 3-bit shift register from the first output value from the first comparator.

A 1-bit shift register multiplies a second output value from the first comparator by ½. A 2-bit shift register multiplies the output value from the 1-bit shift register by ¼. A first adder adds the first output value from the first comparator and the output value from the 2-bit shift register. A second adder adds the output value from the subtractor and the output value from the 1-bit shift register. A second comparator compares the output value from the first adder and the output value from the second adder and outputs a larger one of these output values as an approximate value of the power of the reception signal.

DESCRIPTION OF THE PREFERRED EMBODIMENTS

An embodiment of the invention will now be described with reference to the drawings.

It is to be noted that a description will be made of a case where the invention is applied to a receiver that is equipped in a mobile-station device of, for example, a radio communication system through which a base-station device and the mobile-station device perform radio communication between themselves.

Figure 1:
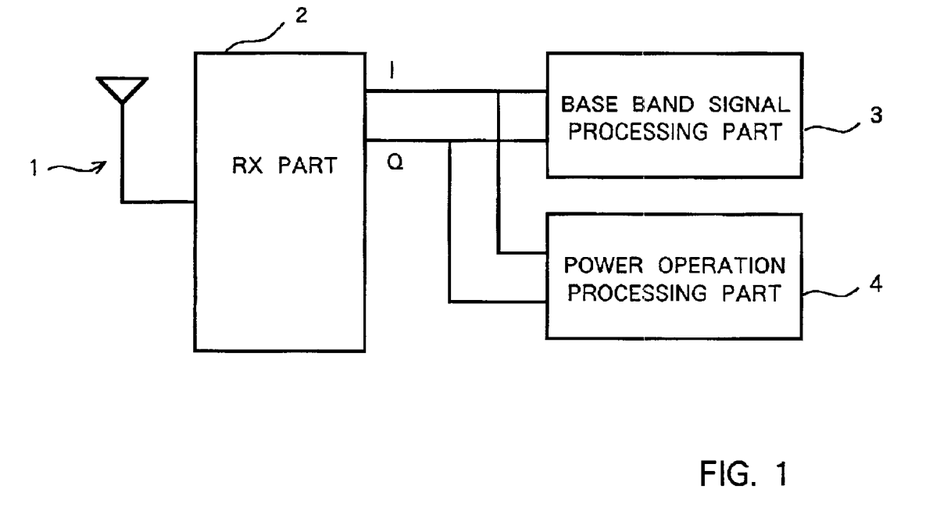
FIG. 1 is a view illustrating an example of the construction of a receiver according to an embodiment of the invention.

In FIG. 1, there is illustrated an example of the construction of the receiver according to this embodiment. This receiver comprises an antenna 1 for transmitting and receiving a radio signal, a reception part (RX part) 2 for performing de-modulation, etc. of the signal received by the antenna 1 into a component I signal and component Q signal, a base-band signal processing part 3 for performing base-band signal processing of the component I signal and component Q signal that are output from the RX part 2, and a power (POWER) operation processing part 4 for performing an operation of an approximate value of the power of the reception signal by the use of the components I and Q that are output from the RX part 2.

Here, the featured portion of the receiver of this embodiment is regarding the construction of the power operation processing part 4 and the process that is executed by this power operation processing part 4. This construction and process will hereafter be explained in detail.

Figure 2:
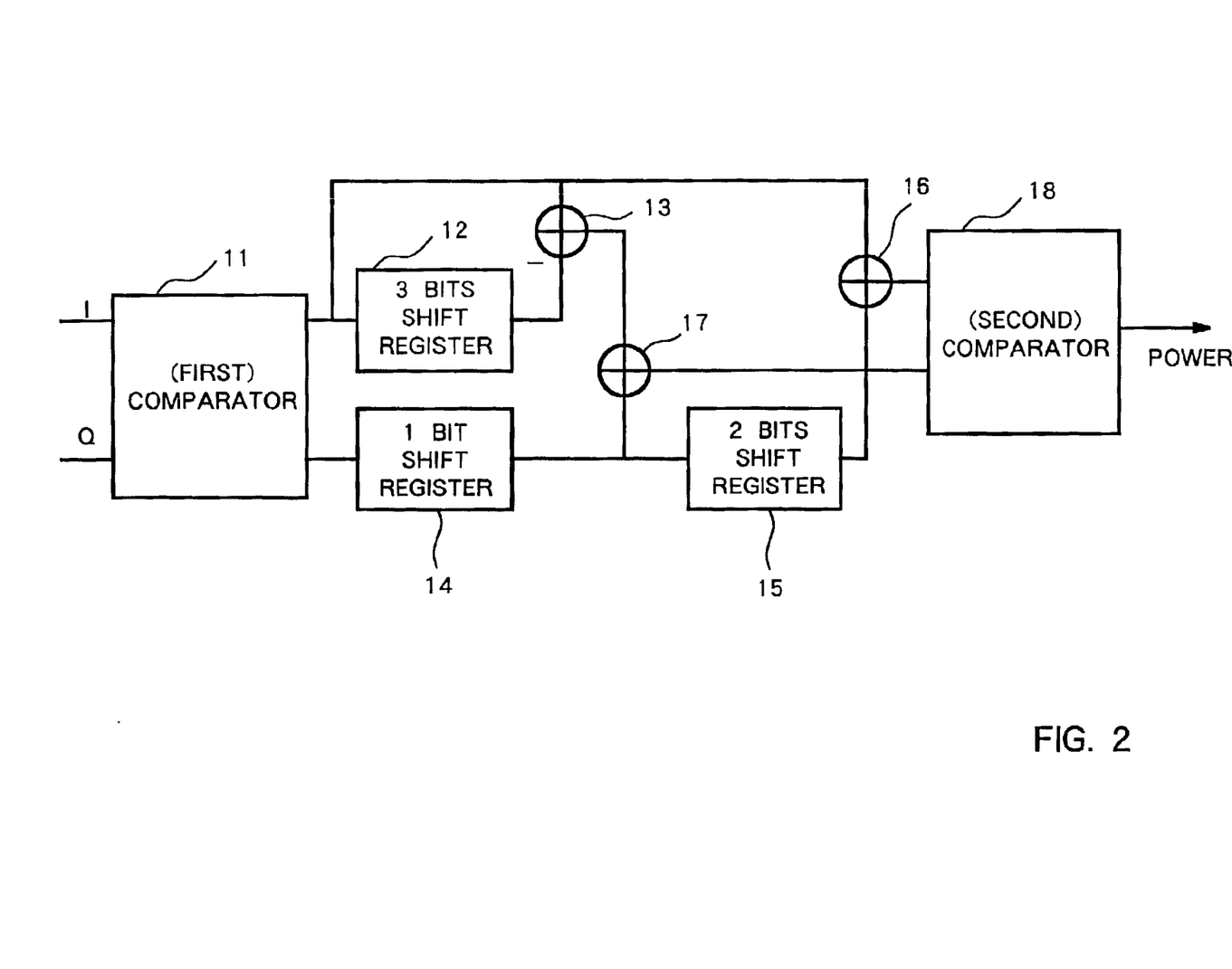
FIG. 2 is a view illustrating an example of the circuit construction of a power operation processing part.

In FIG. 2 there is illustrated an example of the construction of a digital circuit of the power operation processing part 4 of this embodiment. The power operation processing part 4 comprises two comparators 11, 18, three shift registers 12, 14, and 15, one subtractor 13, and two adders 16, 17.

The first comparator 11 has a function to input an I component and a Q component of a reception signal that is output from the RX part 2 and to compare both of the components with each other to determine which is larger or smaller. The first comparator 11 has a function to output a larger one of those components to each of a 3 bit (3 bits) shift register 12, subtractor 13, and first adder 16 as a first output value. The first comparator 11 has a function to output a smaller one of those components to a 1-bit (1 bit) shift register 14 as a second output value.

The 3-bit shift register 12 has a function to shift the first output value input from the first comparator 11 by 3 bits rightward (i.e., to multiply it by ⅛) and to output the resulting value to the substractor 13.

The subtractor 13 has a function to input the first output value from the first comparator 11 and also to input the by-⅛-multiplied value from the 3-bit shift register 12. The substractor 13 performs subtraction of the by-⅛-multiplied value from the first output value. The substractor 13 has a function to output the result (i.e., a value obtained by multiplying the first output value by ⅞) of this subtraction to the second adder 17.

The 1-bit shift register 14 has the following function. Namely, the 1-bit shift register 14 inputs the second output value that is output from the first comparator and performs 1-bit rightward shift of that second output value (i.e., multiplies the second output value by ½). The 1-bit shift register 14 outputs the resulting value to the 2-bit (2 bits) shift register 15 and the second adder 17.

The 2-bit shift register 15 has a function to input the by-½-multiplied value from the 1-bit shift register 14, to perform 2-bit rightward shift thereof (i.e., to perform ¼ multiplication thereof), and to output the resulting value to the first adder 16.

The first adder 16 has the following function. Namely, the first adder 16 inputs the first output value from the first comparator 11 and also inputs the by-¼-multiplied value (the by-⅛-multiplied value of the second output value) from the 2-bit shift register 15. The first adder 16 adds the first output value and the by-¼-multiplied value to thereby output the result of addition to the second comparator 18.

The second adder 17 inputs the result of subtraction from the subtractor 13 and inputs the by-½-multiplied value from the 1-bit shift register 14. The second adder 17 adds the result of subtraction and the by-½-multiplied value and outputs the result of this addition to the second comparator 18.

The second comparator 18 compares the result of addition that is output from the first adder 16 and the result of addition that is output from the second adder 17, with each other, to determine which is larger or smaller. The second comparator 18 thereby outputs a larger one of the both results of additions as an approximate value of the power of the reception signal.

With a circuit construction such as that described above, in the power operation processing part 4 of this embodiment, the value (a larger one of the two results of the above-described additions) that is output from the second comparator 18 is detected as the power (an approximate value) of the reception signal.

Here, the addition result P1 that is output from the first adder 16 is given by the following Equation No. 4 while the addition result P2 that is output from the second adder 17 is given by the following Equation No. 5. It is to be noted that the approximate equation that is given as the Equation No. 4 or 5 is suitable for the execution of the digital operation process and so is easy to realize with the use of the digital circuit.

[Equation No. 4]

$$P1 = \text{MAX}\,(|I|,|Q|) + (\tfrac{1}{8}) \times \text{MIN}\,(|I|,|Q|) \tag{4}$$

[Equation No. 5]

$$P2 = (\tfrac{14}{16}) \times \text{MAX}\,(|I|,|Q|) + (\tfrac{1}{2}) \times \text{MIN}\,(|I|,|Q|) \tag{5}$$

Also, the value that is output as the power (approximate value) P of the reception signal from the second comparator 18 is given as the following Equation No. 6. It is to be noted that MAX (P1, P2) represents a larger one of the values P1 and P2.

[Equation No. 6]

$$P = \text{MAX}\,(P1, P2) \tag{6}$$

Figure 3:
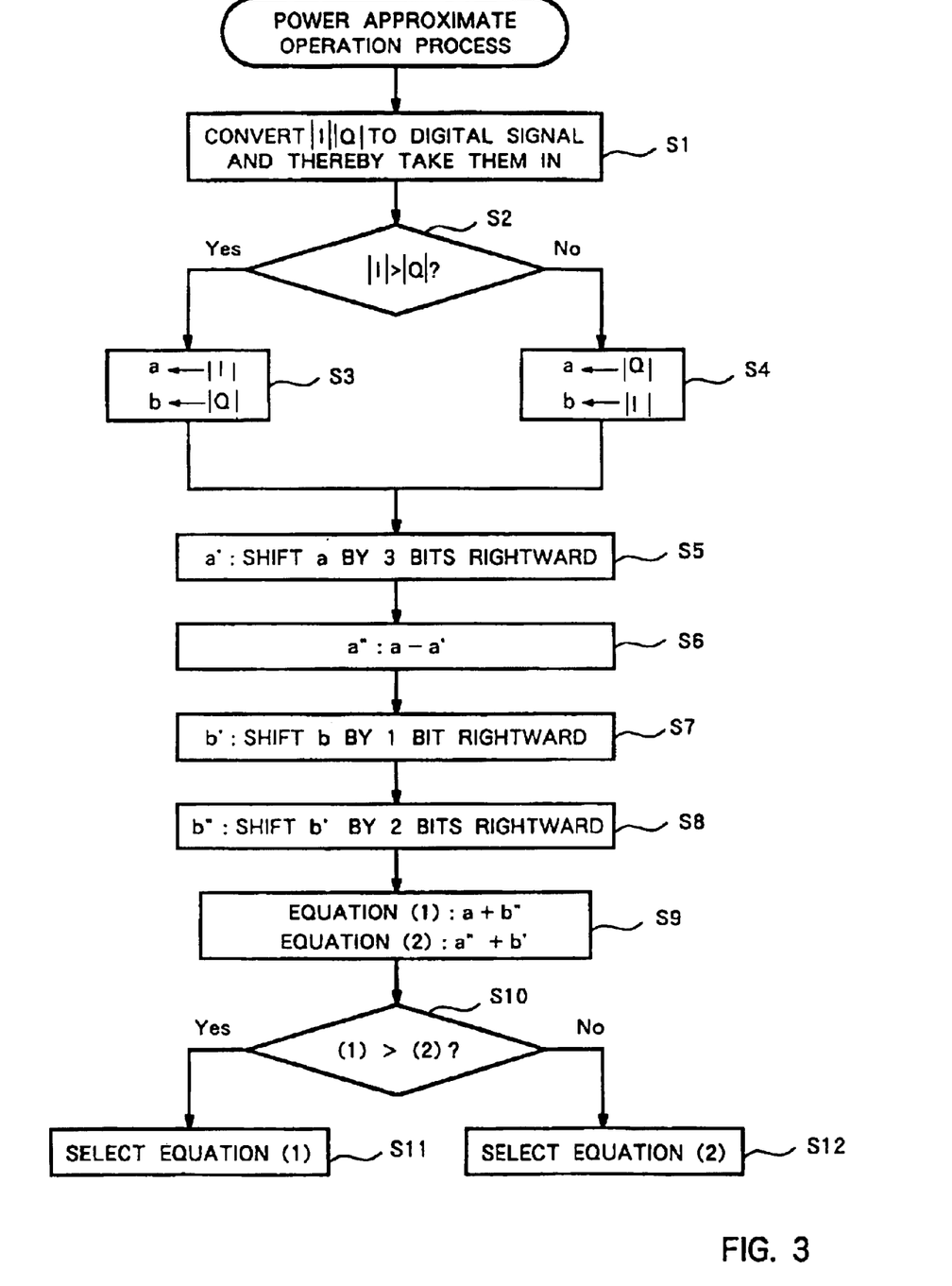
FIG. 3 is a view illustrating an example of the procedure of a power approximate-operation processing according to the embodiment of the invention.

In FIG. 3, there is illustrated an example of the procedure of the power approximate-operation process executed in the power operation processing part 4 of this embodiment.

Namely, in the power operation processing part 4, first, a component I and component Q of the reception signal are taken in as digital signals (step S1). The first comparator 11 then compares the component I and the component Q with each other to determine which one of them is larger or smaller (step S2).

As a result of this, if the component I is larger, the component I is set to be, for example, a (the first output value)=I, and the component Q is set to be, for example, b (the second output value)=Q (step S3). If the component Q is larger, the component Q is set to be a=Q, and the component I is set to be b=I (step S4).

Next, in the power operation processing part 4, the 3-bit shift register 12 outputs a value (i.e., a value obtained by multiplying the a by ⅛) a' that is obtained by shifting the a by 3 bits rightward (step S5). The subtractor 13 outputs a value a" (=a−a') that is obtained by subtracting the a' from the a (step S6). The 1-bit shift register 14 outputs a value (i.e., a value obtained by multiplying the b by ½) b' that is obtained by shifting the b by 1 bit rightward (step S7). The 2-bit shift register 15 outputs a value (i.e., a value obtained by multiplying the b' by ¼) b" that is obtained by shifting the b' by 2 bits rightward (step S8).

Then, in the power operation processing part 4, (a+b") (the equation (1)) is calculated by the first adder 16, and (a"+b') (the equation (2)) is calculated by the second adder 17 (step S9). The second comparator 18 compares these two calculation results (addition results) with each other to determine which one of these results is larger or smaller (step S10). A larger one of those results is selected and is output as an approximate value of the power of the reception signal (step S11, step S12).

In this way, the receiver according to the invention has the feature of performing the calculation of an approximate value of the power of the reception signal by the use of a plurality of the approximate equations.

Figure 4:
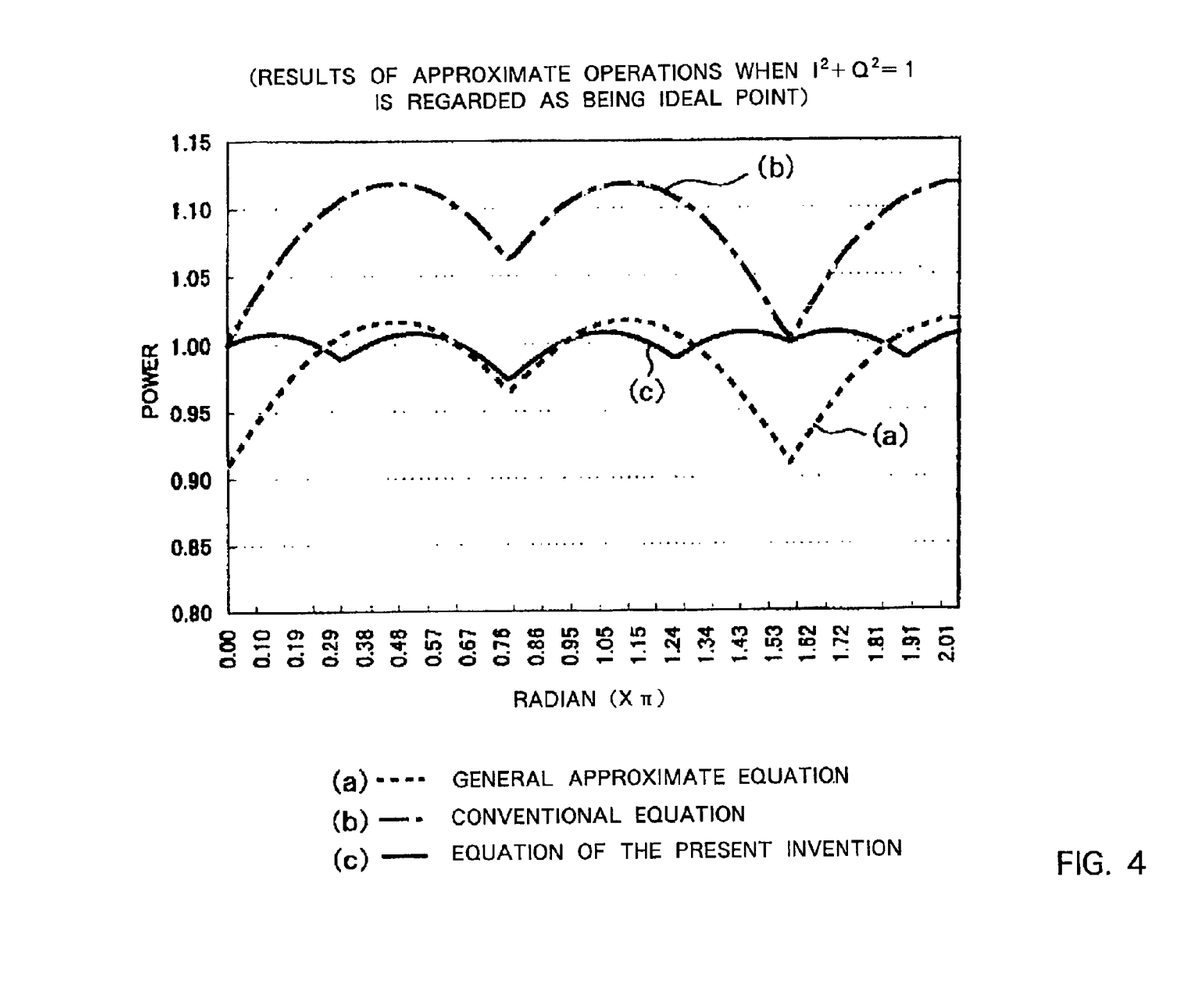
FIG. 4 is a view illustrating an example of the comparison of a power approximate-operation according to the conventional technique and a power approximate-operation according to the embodiment of the invention.

Also, in FIG. 4, there is illustrated an example of the graphic diagram wherein comparison is made between the precision of the power approximate-operation that is executed in the receiver of this embodiment and the precision of the power approximate-operation that is executed in the conventional receiver by the use of the Equation No. 3 shown under the item "Description of the Related Art". The abscissa axis of the graph represents the phase (radian (x n)), and the ordinate axis represents the power.

In the graph illustrated in FIG. 4, there are illustrated the result of the power approximate-operation that is obtained using a general approximate equation, as (a) (general approximate equation), the result of the power approximate-operation that is obtained from the conventional receiver, as (b) (conventional approximate equation), and the result of the power approximate-operation that is obtained from the receiver of this embodiment, as (c) (approximate equation of the invention), respectively. It is to be noted that each of these results is the one that is obtained under the assumption that the power corresponding to the equation $(I^2 + Q^2) = 1$ be an ideal value.

As illustrated in FIG. 4, in the approximate equation that is used in the conventional receiver, the calculation error is large in value. So, an error that amounts even to 11.8 percent (%) at maximum inconveniently occurs. Further, in, for example, a mobile-station device, it sometimes happens that it becomes necessary to measure the SIR (Signal to Interference Ratio). However, when performing such a measurement, in the conventional receiver, a very large error inconveniently occurs because the error of that measurement is added to the above-described calculation error.

On the other hand, in the approximate equation used in the receiver of this embodiment, 0.78 percent (%) or less of error only occurs even at maximum. That is, the error is very small in value and therefore, the precision is excellent.

As described above, according to the receiver of this embodiment, using, for example, the digital circuit that has been constructed of the shift registers, comparator, etc., as illustrated in FIG. 2, a highly precise approximate value of the power of the reception signal can be detected with a high speed. It thereby becomes possible to ensure a high quality of communication.

Incidentally, in this embodiment, there is the function of performing an operation of the addition result P1 shown in the Equation No. 4 previously referred to by the first comparator 11, 1-bit shift register 14, 2-bit shift register 15, and first adder 16. By reason of this function, these elements constitute first operation means referred to in the invention.

Also, in this embodiment, there is the function of performing an operation of the addition result P2 shown in the Equation No. 5 previously referred to by the first comparator 11, 3-bit shift register 12, subtractor 13, 1-bit shift register 14, and second adder 17. By reason of this function, these elements constitute second operation means referred to in the invention.

Also, in this embodiment, there is the function of selecting and detecting a larger one of those two addition results P1 and P2 as an approximate value of the power of the reception signal by the second comparator 18. By reason of this function, this comparator 18 constitutes detection means referred to in the invention.

Here, in this embodiment, using the digital circuit construction preferred to realize the operations shown in the Equation Nos. 4 to 6 referred to above, this operation has been executed. However, the approximate equation used in the invention is not limited to the embodiment of the Equation Nos. 4 to 6. If there is the feature of executing operations using, for example, a plurality of approximate equations to thereby calculate a plurality of candidates each becoming an approximate value of the power of the reception signal and thereby detecting an excellent one from among the plurality of candidates as an approximate value of the power of the reception signal, any approximate equations may be used. Also, no particular limitation is imposed on the construction of the receiver according to the invention, either. In the receiver according to the invention, for example, a construction to execute the operations using a DSP, CPU, etc. may also be adopted.

Namely, in this embodiment, the respective function means for executing the power approximate-operation process according to the invention have been constructed as a hardware circuit. However, in the invention, it may be arranged that in the hardware material equipped with, for example, a processor, memory, etc., the processor executes a control program stored in a ROM, thereby the process be executed. Also, the invention can also be taken to be a recording medium from which data is readable by a relevant computer, such as a floppy disk or CD-ROM, having stored therein such a control program. This control program can be input from the recording medium to the computer and be executed by the processor, thereby the process according to the invention can be performed.

Also, the receiver according to the invention can be applied not only to, for example, a mobile-station device of the radio communication system. The point is that only if a receiver is able to detect the power (an approximate value in the case of the invention) of the reception signal, the receiver of the invention can be also applied to, for example, a base-station device, relay-station device, and other communication devices.

As has been described above, according to the receiver of the present invention, using, for example, a digital circuit, a value obtained by multiplying a smaller one of the component I and the component Q of the reception signal by $\frac{1}{8}$ and a larger one of these two components are added together according to a plurality of approximate equations. A value obtained by multiplying a smaller one of the components I and Q of the reception signal by $\frac{1}{2}$ and a value obtained by multiplying a larger one of these components by $\frac{7}{8}$ are added together similarly. Of these two addition results, the value of a larger one thereof is detected as an approximate value of the power of the reception signal. Therefore, for example, it is possible to detect a highly precise approximate value compared to the conventional receiver as illustrated in the above-described embodiment. Thereby, a highly precise and high-speed detection of the power can be realized.

What is claimed is:

1. A receiver for detecting an approximate value of the power of a reception signal, the receiver comprising:

first operation means for adding a value obtained by multiplying a smaller one of a component I and a component Q of the reception signal by $\frac{1}{8}$ and a value of a larger one of the components I and Q;

second operation means for adding a value obtained by multiplying the smaller one of the component I and the component Q of the reception signal by $\frac{1}{2}$ and a value obtained by multiplying the larger one of the components I and Q by $\frac{7}{8}$; and detection means for detecting a value of a larger one of an operation result of said first operation means and an operation result of said second operation means as the approximate value of the power of the reception signal.

2. A receiver for detecting an approximate value of the power of a reception signal, the receiver comprising:

a first comparator for comparing a component I and a component Q of the reception signal with each other to determine which one of the components I and Q is larger or smaller to thereby output a larger component as a first output value and output a smaller component as a second output value;

a 3-bit shift register for multiplying the first output value from said first comparator by $\frac{1}{8}$;

a subtractor for subtracting an output value from said 3-bit shift register from the first output value from said first comparator;

a 1-bit shift register for multiplying the second output value from said first comparator by $\frac{1}{2}$;

a 2-bit shift register for multiplying an output value from said 1-bit shift register by $\frac{1}{4}$;

a first adder for adding the first output value from said first comparator and an output value from said 2-bit shift register;

a second adder for adding an output value from said subtractor and the output value from said 1-bit shift register; and a second comparator for comparing an output value from said first adder and an output value from said second adder with each other to determine which one of the output values is larger or smaller and output a value of a larger one thereof as the approximate value of the power of the reception signal.

3. A mobile-station device for detecting an approximate value of the power of a signal radio-received from a base-station device, the mobile-station device including a receiver comprising:

first operation means for adding a value obtained by multiplying a smaller one of a component I and a component Q of the reception signal by ⅛ and a value of a larger one of the components I and Q;

second operation means for adding a value obtained by multiplying the smaller one of the component I and the component Q of the reception signal by ½ and a value obtained by multiplying the larger one of the components I and Q by ⅞; and detection means for detecting a value of a larger one of an operation result of said first operation means and an operation result of said second operation means as the approximate value of the power of the reception signal.

4. A mobile-station device for detecting an approximate value of the power of a signal radio-received from a base-station device, the mobile-station device including a receiver comprising:

a first comparator for comparing a component I and a component Q of the reception signal with each other to determine which one of the components I and Q is larger or smaller to thereby output a larger component as a first output value and output a smaller component as a second output value;

a 3-bit shift register for multiplying the first output value from said first comparator by ⅛;

a subtractor for subtracting an output value from said 3-bit shift register from the first output value from said first comparator;

a 1-bit shift register for multiplying the second output value from said first comparator by ½;

a 2-bit shift register for multiplying an output value from said 1-bit shift register by ¼;

a first adder for adding the first output value from said first comparator and an output value from said 2-bit shift register;

a second adder for adding an output value from said subtractor and the output value from said 1-bit shift register; and a second comparator for comparing an output value from said first adder and an output value from said second adder with each other to determine which one of the output values is larger or smaller and output a value of a larger one thereof as the approximate value of the power of the reception signal.

5. A detection method for detecting an approximate value of the power of a signal received from a receiver, the detection method comprising:

adding a value obtained by multiplying a smaller one of a component I and a component Q of the reception signal by ⅛ and a value of a larger one of the components I and Q to set an addition result as a first operation result;

adding a value obtained by multiplying the smaller one of the component I and the component Q of the reception signal by ½ and a value obtained by multiplying the larger one of the components I and Q by ⅞ to set an addition result as a second operation result; and detecting a value of a larger one of the first operation result and the second operation result as the approximate value of the power of the reception signal.

6. A detection method for detecting an approximate value of the power of a signal received from a receiver, the detection method comprising:

comparing a component I and a component Q of the reception signal with each other to determine which one of the components I and Q is larger or smaller through operation of a first comparator, to thereby output a larger component as a first output value and output a smaller component as a second output value;

multiplying the first output value from the first comparator by ⅛ through operation of a 3-bit shift register;

subtracting an output value from the 3-bit shift register from the first output value from the first comparator through operation of a subtractor;

multiplying the second output value from the first comparator by ½ through operation of a 1-bit shift register;

multiplying an output value from the 1-bit shift register by ¼ through operation of a 2-bit shift register;

adding the first output value from the first comparator and an output value from the 2-bit shift register through operation of a first adder;

adding an output value from the subtractor and the output value from the 1-bit shift register through operation of a second adder; and comparing an output value from the first adder and an output value from the second adder with each other through operation of a second comparator, to thereby determine which one of the output values is larger or smaller and detect a value of a larger one thereof as the approximate value of the power of the reception signal.

7. A detection method for detecting and outputting an approximate value of the power of a signal received from a receiver, the detection method comprising:

performing a plurality of operations using a plurality of approximate equations that are different from each other and each include at least one bit shift operation, at least one add or subtract operation and at least one compare operation, to calculate from the same reception signal a plurality of candidates for the approximate value of the power of the reception signal; and detecting an excellent candidate from among the plurality of candidates as the approximate value of the power of the reception signal to outputted.

* * * * *